(12) United States Patent  
Kammer et al.

(10) Patent No.: US 6,943,667 B1  
(45) Date of Patent: Sep. 13, 2005

(54) METHOD FOR WAKING A DEVICE IN RESPONSE TO A WIRELESS NETWORK ACTIVITY

(75) Inventors: David Kammer, Seattle, WA (US); Mark T. Davis, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 301 days.

(21) Appl. No.: 10/083,044

(22) Filed: Feb. 25, 2002

(51) Int. Cl.[7] .............................................. G08B 7/02
(52) U.S. Cl. ................. 340/286.01; 702/188; 709/227; 713/324
(58) Field of Search .................... 340/286.01; 709/203, 709/223, 218, 227; 713/320, 323, 324, 300; 455/54.1; 702/188

(56) References Cited

U.S. PATENT DOCUMENTS

| | | | |
|---|---|---|---|
| 5,386,435 A * | 1/1995 | Cooper et al. .............. | 375/134 |
| 5,566,357 A * | 10/1996 | Holcman .................... | 455/445 |
| 6,289,464 B1 * | 9/2001 | Wecker et al. ............. | 713/300 |
| 6,443,891 B1 * | 9/2002 | Grevious .................... | 600/302 |
| 6,523,073 B1 * | 2/2003 | Kammer et al. ............. | 710/48 |
| 6,671,660 B2 * | 12/2003 | Freed ......................... | 702/188 |
| 6,681,244 B1 * | 1/2004 | Cross et al. ................. | 709/203 |
| 6,728,892 B1 * | 4/2004 | Silvkoff et al. ............. | 713/320 |

* cited by examiner

Primary Examiner—Brent A. Swarthout  
(74) Attorney, Agent, or Firm—Wagner, Murabito & Hao LLP (57) ABSTRACT

A method and a system for data transmission between a first electronic device and a second electronic device, wherein the second electronic device is in a sleep mode. Transmission of data between the first electronic device and the second electronic device occurs while a microprocessor in the second device is in sleep mode and the wireless transceiver is in a wake mode. The first electronic device transmits data signals and the second electronic device detects the transmitted signal. A base band processor in the second electronic device optionally determines if the signal is from a known source. If the first electronic device is a known electronic device, an interrupt signal is generated to wake up the microprocessor in the second electronic device. The wakened microprocessor opens a communication port and disables the wake-up interrupt. In yet another embodiment of the present invention, the data receive line is directly coupled to a line that triggers an interrupt when a signal is detected. The received message is then stored in memory for subsequent use.

17 Claims, 7 Drawing Sheets

METHOD FOR WAKING A DEVICE IN RESPONSE TO A WIRELESS NETWORK ACTIVITY

BACKGROUND OF THE INVENTION

1. Field of the Invention

The present invention relates to the field of communications between computer systems. More specifically, embodiments of the present invention relate to the field of communications between computer systems when a receiving computer system is in a sleep mode.

2. Related Art

Typically, a network administrator oversees the operation of remotely located computer systems and renders specific administrative services to all computer systems on the network. Conventionally, a computer network administrator can access computer systems coupled to a network and perform certain administrative functions and services. Such services may include: functionally removing a computer system from the network; logging-into remotely located computer systems to perform administrative functions; or upgrading a specific software application on a remote computer system.

Personal computers are generally turned off during off-hours to conserve energy. In some instances, a network administrator may have to access a remote computer during the off-hours to perform some administrative functions. In such situations, it is desirable to wake the computer system up from the sleep mode, perform the administrative function and allow the computer system to return to its sleep mode.

Conventially, through the use of a special wired protocol over the Ethernet, personal computers, which are communicatively coupled to a wired network, can be brought out of their sleep mode from a remote location. Such capability is available through the use of an Ethernet card, which can be installed in a personal computer. The Ethernet protocol allows a system administrator to access a remotely located computer system, which is in a sleep mode, wake the computer system up and perform the administrative or system update. However, the Ethernet protocol capability is limited. This wired protocol is not designed for communication between two people or for posting message and receiving data. This protocol is an enabling device for allowing a user of a personal computer system to turn off the system during the off-hours to conserve energy while the system is capable of receiving administrative services while in a sleep mode.

A somewhat similar method for waking up an electronic device from a sleep mode is used in the paging technology. In paging technology, you may have a device, which is generally turned off but can receive information while in a sleep mode. The method used in paging technology requires the microprocessor in the device to periodically wake up and scan the network for messages. In case a message is detected by the system, the microprocessor in the device comes out of its sleep and resumes full functionality to receive massages and returns to the sleep mode afterward. However, this method still requires a microprocessor to periodically wake up and conduct scanning and is not a very comprehensive method of saving energy.

Therefore, a need exists for wireless communication between computer systems to receive messages while the receiving device is in a sleep mode. Furthermore, the prior art does not provide a system to communicate information to a microprocessor while it is in a sleep mode.

SUMMARY OF THE INVENTION

Accordingly, the present invention enables a wireless handheld computer device to receive messages from another wireless computer device while the receiving device's microprocessor is in a sleep mode. Embodiments of the present invention describe different methods to automatically wake up a receiving microprocessor from a sleep mode in response to a wireless message being received thereby. An embodiment of the present invention enables a device to receive messages, while the host device is turned off. In another embodiments of the present invention, hardware is added to the receiving device enabling the receiving device's microprocessor to wake up, receive the information transmitted, and returns to the sleep mode. The present invention is capable of supporting different communication protocols (e.g., Bluetooth, IR, etc.).

In one embodiment, a receiving device, e.g., a handheld computer, contains a radio device that is always active scanning for traffic. The radio may be scanning while the microprocessor of the handheld computer is sleeping. Upon receiving traffic, the radio generates an interrupt to the microprocessor to wake the microprocessor. The interrupt service routine then enables a communication port to open and the message is received and stored in cache memory. The microprocessor then returns to the sleep mode. When powered up at a subsequent time, the user is notified that a message was received and can accept or reject the message as appropriate.

In another embodiment, a first electronic device transmits information to a second electronic device using a wireless communication protocol while the second electronic device is in a sleep mode. The second electronic device comprises a microprocessor and a wireless communication device, where the microprocessor in the second electronic device is in a sleep mode and the communication device in the second electronic device is in a wake mode. A base band processor coupled to the second wireless communication device determines whether the first electronic device is a known electronic device. If the first electronic device is a known device, the base band processor automatically triggers an interrupt signal to wake up the microprocessor. The interrupt signal wakes the microprocessor in the second device to its full capability. The microprocessor in the second electronic device commands its operating system to look up the interrupt vector residing in the operating system and to determine the type of communication protocol. The microprocessor commands an appropriate communication port to open and receive the transmitted information. The microprocessor returns to the sleep mode after completion of the information transmittal and the storage of the message.

In yet another embodiment of the present invention, the antenna is directly coupled to a line that triggers an interrupt when a message is detected. The interrupt causes the microprocessor to wake up, open a communication port and disable the interrupt line. The message is then recorded and the microprocessor may return to sleep mode.

DETAILED DESCRIPTION OF THE INVENTION

Reference will now be made in detail to the preferred embodiments of the present invention, a method for waking a device in response to wireless communication activity, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or "transmitting" or "beaming" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a wireless or other communication protocol and organized records of information, such as a cell phone or a pager. One of the common types of electronic systems, which can be used in accordance with one embodiment of the present invention, is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface).

In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 1:
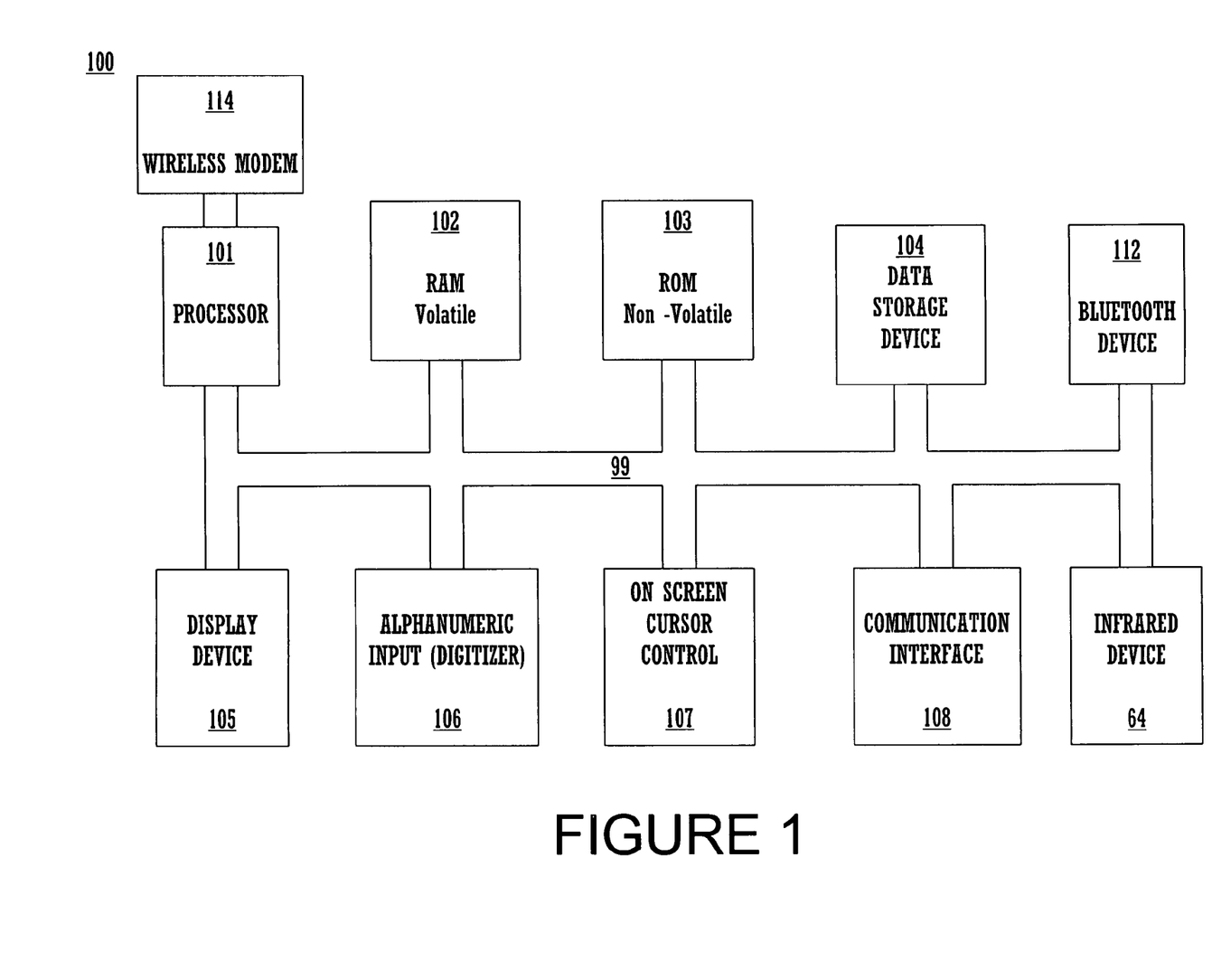
FIG. 1 is a block diagram of an exemplary portable computer system.

FIG. 1 is a block diagram of exemplary circuitry of portable computing system 100 in accordance with one embodiment of the present invention. The computer system 100 includes an address/data bus 99 for communicating information, a central processor 101 coupled with the bus 99 for processing information and instructions. It is appreciated that central processor unit 101 may be a microprocessor or any other type of processor. The computer system 100 also includes data storage features such as a volatile memory 102 (e.g., random access memory, static RAM, dynamic RAM, etc.) coupled with the bus 99 for storing information and instructions for the central processor 101 and a non-volatile memory 103 (e.g., read only memory, programmable ROM, flash memory, EPROM, EEPROM, etc.) coupled with the bus 99 for storing static information and instructions for the processor 101. Computer system 100 may also include an optional data storage device 104 (e.g., thin profile removable memory) coupled with the bus 99 for storing information and instructions. It should be understood that device 104 may be removable. Furthermore, device 104 may also be a secure digital (SD) card reader or equivalent removable memory reader.

Also included in computer system 100 of FIG. 1 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus 80 and also simultaneously records the pressure that the stylus 80 exerts on the face of the digitizer pad 106.

System 100 of FIG. 1 also includes an optional cursor control or directing device 107 coupled to the bus 99 for communicating user input information and command selections to the central processor 101. In one implementation, device 107 is a touch screen device (also a digitizer) incorporated with display screen 105. Device 107 is capable of registering a position on the screen 105 where the stylus 80 makes contact and the pressure of the contact.

Computer system 100 also contains a flat panel display device 105 coupled to the bus 99 for displaying information to the computer user. The display device 105 utilized with the computer system 100 may be a liquid crystal device (LCD), cathode ray tube (CRT), field emission device (FED, also called flat panel CRT), plasma or other display technology suitable for creating graphic images and/or alphanumeric characters recognizable to the user.

Also included in computer system 100 of FIG. 1 is a signal communication device 108 coupled to bus 99 that may be a serial port (or USB port) for enabling system 100 to communicate with a remote device (not shown). As mentioned above, in one embodiment, the communication interface 108 is a serial communication port, but could also alternatively be of any of a number of well known communication standards and protocols, e.g., parallel, SCSI, Ethernet, FireWire (IEEE 1394), USB, etc. In addition to device 108, wireless communication links can be established between the device 100 and a host computer system (or another portable computer system) using a Bluetooth wireless device 112, an infrared (IR) device 64, or a Global System for Messaging (GSM) radio device 114. System 100 may also include a wireless modem device 114 and/or a wireless radio, e.g., a GSM wireless radio with supporting chip set.

In one implementation, the Mobitex wireless communication system may be used to provide two way communication between computer system 100 and other networked computers and/or the Internet (e.g., via a proxy server). In other embodiments, transmission control protocol (TCP) can be used or Short Message Service (SMS) can be used.

Figure 2:
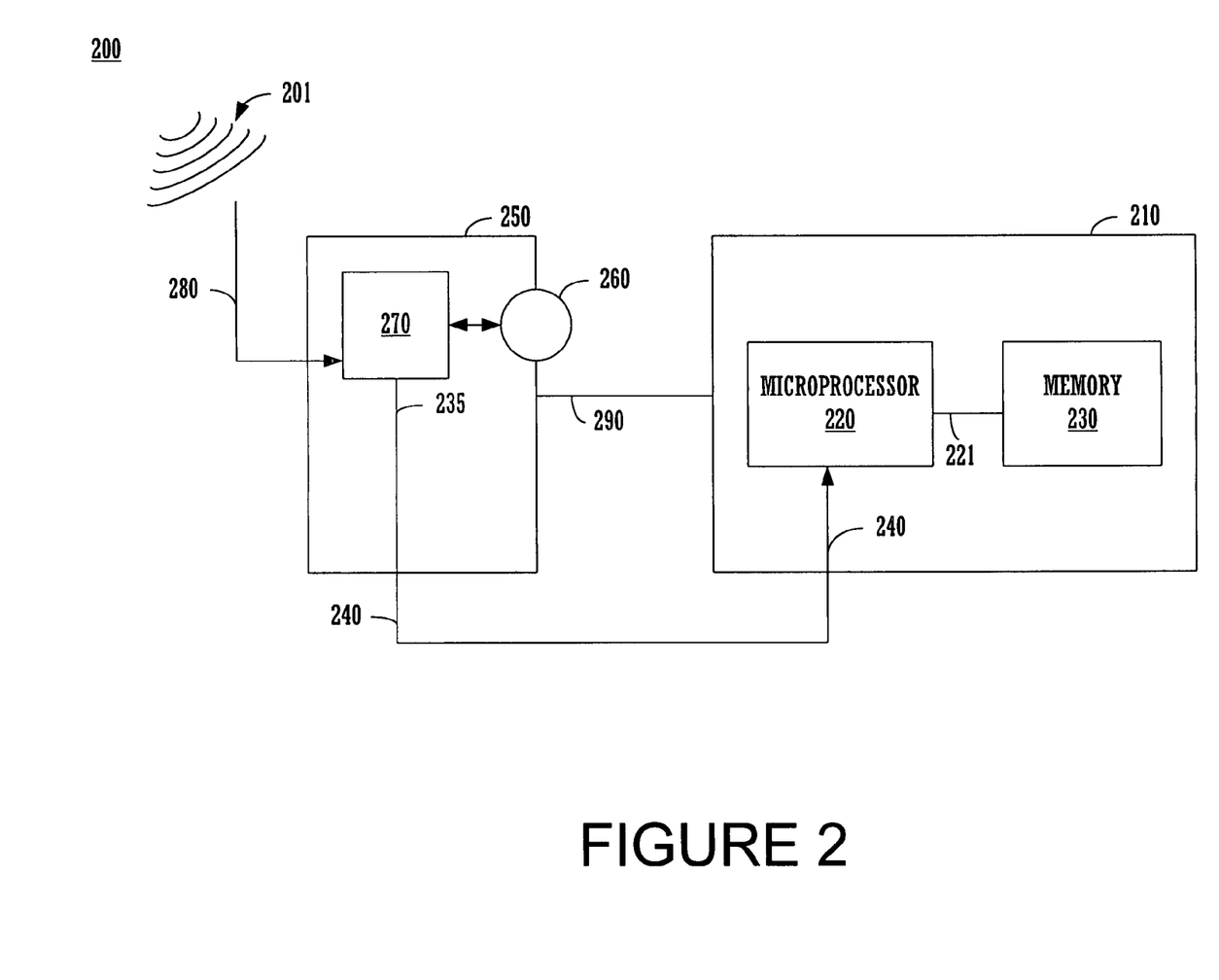
FIG. 2 is an illustration of an embodiment of the present invention depicting a receiving electronic device including a transceiver circuit, a microprocessor and the associated memory.

FIG. 2 is an illustration of an embodiment of the present invention depicting a receiving electronic device 200 comprising a transceiver circuit 250 e.g., radio 112, and device circuit 210. According to one embodiment of the present invention, microprocessor 220 can be placed in a sleep mode. It is appreciated that microprocessor 220, in a sleep mode, is capable of performing certain activities such as keeping memory refreshed or periodically waking up, however, during the sleep mode microprocessor 220 does not perform to its full capability. It is further appreciated that maintaining a microprocessor in a sleep mode is generally desired for energy conservation. Memory 230 is coupled to microprocessor 220 for storing information received by electronic device 200 including the software required for the operation of electronic device 200.

Transceiver circuit 250 comprises optional antenna 280, base band processor 270, and communication port 260 (e.g., serial port, universal serial bus, etc.). In one embodiment of the present invention transceiver circuit 250 may monitor wireless traffic received over antenna 280 while microprocessor 220 is in the sleep mode. Transceiver circuit 250 continuously scans a set of defined frequencies (e.g., page scan in Bluetooth standard) for an in-bound signal.

A remote device (e.g., a transmitting electronic device, not shown) transmits a signal to receiving device system 200. The transmitted signal may be an out of band signal requesting a connection. Circuit 250 scanning for in-bound signals detects signal 201 transmitted by the transmitting electronic device.

The signal transmitted by the transmitting electronic device requests a connection and may not contain user data. Antenna 280 coupled to base band processor 270 receives signal 201 (e.g., incoming connection request) and transmits an interaction to base band processor 270, where base band processor 270, having a certain processing capability, determines if the signal is a connection attempt. Base band processor 270 coupled to communication port 260, determines: a) if communication port 260 is closed; and b) if signal 201 is transmitted by a trusted device.

In case communication port 260 is closed and signal 201 is from a trusted device, base band processor 270 toggles an outside line 235, which is coupled to an interrupt mechanism (not shown), causing the generation of an interrupt signal. Generation of the interrupt signal may be done in accordance with a extension of the communication protocol (e.g., Bluetooth specification) which allows transceiver circuit 250 to select a line coupled to the interrupt mechanism and toggle the line if communication port 260 is closed. Accordingly, when communication port 260 is closed, the outside line is toggled and the interrupt mechanism generates an interrupt signal. The interrupt signal is then transmitted to microprocessor 220 via interrupt line 240 causing microprocessor 220 to wake up to its full operational capability. An interrupt vector including different communication protocols (e.g., Bluetooth, IR, etc.) resides in the operating system (not shown) of microprocessor 220. Microprocessor 220, responding to the interrupt signal, sends a command to its operating system to invoke an appropriate communication protocol (e.g., Bluetooth, IR, etc.). Accordingly, a communication protocol is invoked and causes communication port 260 to open and receive data signal 201.

If the port 260 was already open when the message was received, the interrupt signal is still generated to wake the microprocessor 220. Once wakened, it receives the message from the open port.

Figure 3:
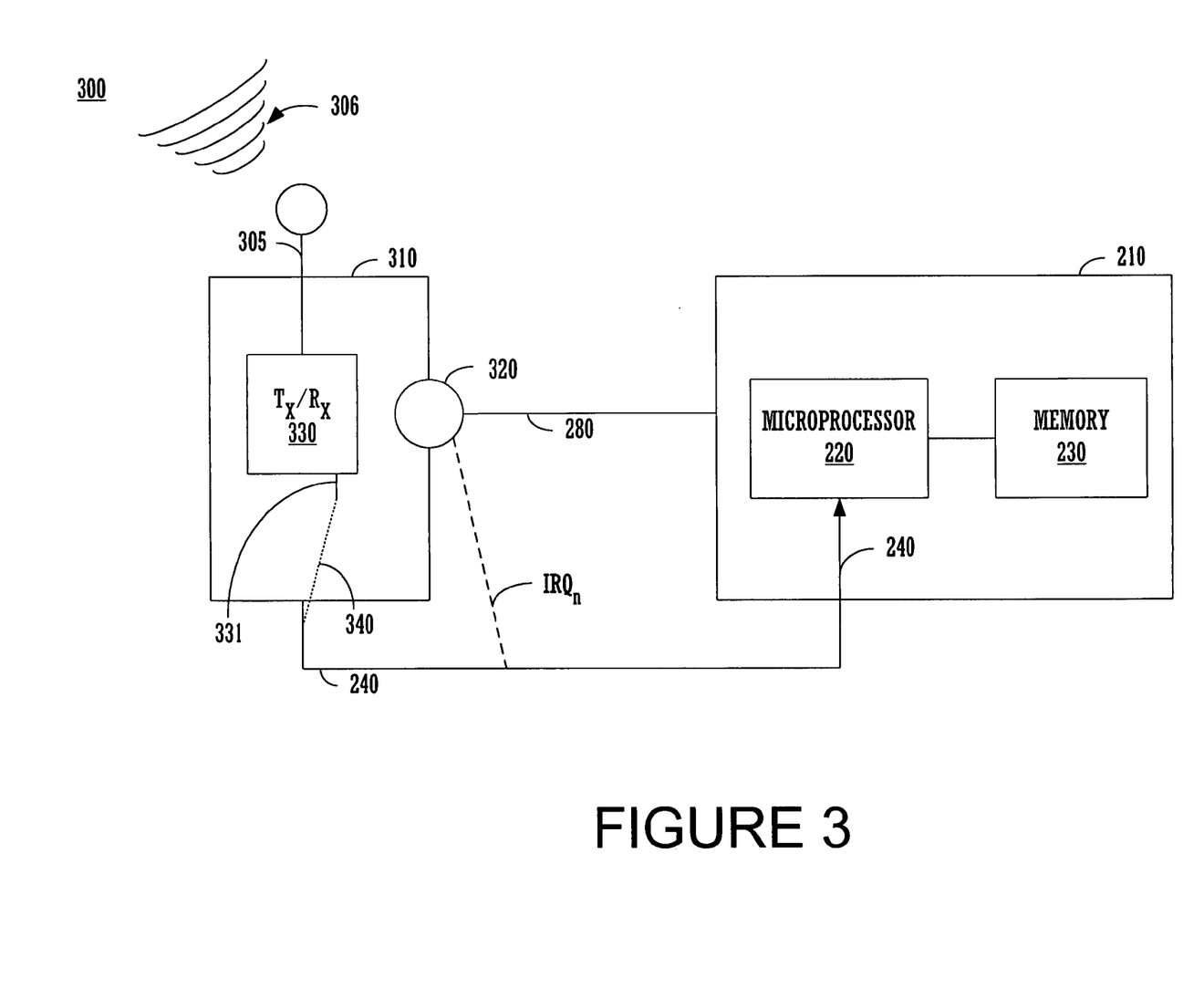
FIG. 3 is illustration of another embodiment of the present invention depicting a receiving electronic device including a transceiver circuit, a microprocessor and the associated memory, according to one embodiment of the presently claimed invention.

FIG. 3 is an illustration of another embodiment of the present invention depicting a receiving electronic device 300 comprising transceiver circuit 310, and device circuit 210. According to one embodiment of the present invention, microprocessor 220 is in a sleep mode while antenna 305 coupled to transceiver circuit 330 may continuously scan for an in bound signal. Memory 230 coupled to microprocessor 220 stores software required for the operation of electronic device 300 and also for storing information received by electronic device 200. Transceiver circuit 310 includes antenna 305, transceiver 330, and communication port 320 (e.g., serial port, universal serial bus, etc.).

According to this embodiment of the present invention, a reliable transport protocol (e.g., RS 2232 transport protocol, Blue Core Serial Port, etc.) may be used over a serial or USB communication port. It is appreciated that this embodiment of the present invention couples the receiving line 331 ($R_x$) of transceiver circuit 330 to the interrupt mechanism (not shown) directly. The interrupt mechanism is disabled whenever serial port 320 is open and microprocessor 220 is awake. The interrupt mechanism is enabled when microprocessor 220 is in the sleep mode. When the communication port 320 is closed, transceiver device 330 receives signal 306 from antenna 305 and attempts to send transmitted data 306. Continuous attempts by transceiver circuit to send transmitted data 306 causes toggling of the $R_x$ line 331 until the interrupt mechanism (not shown) is triggered to generate an interrupt signal. The interrupt signal is transmitted to microprocessor 220 via interrupt line 240 and microprocessor 220 receives the interrupt signal awakens and opens communication port 320. When communication port 320 opens, microprocessor 220 receives transmitted data 306 and stores transmitted data 306 in memory 230. It is appreciated that according to this embodiment of the invention, device circuit 210 optionally authenticates trustworthiness of the transmitting device after the communication port 320 is open.

Figure 4:
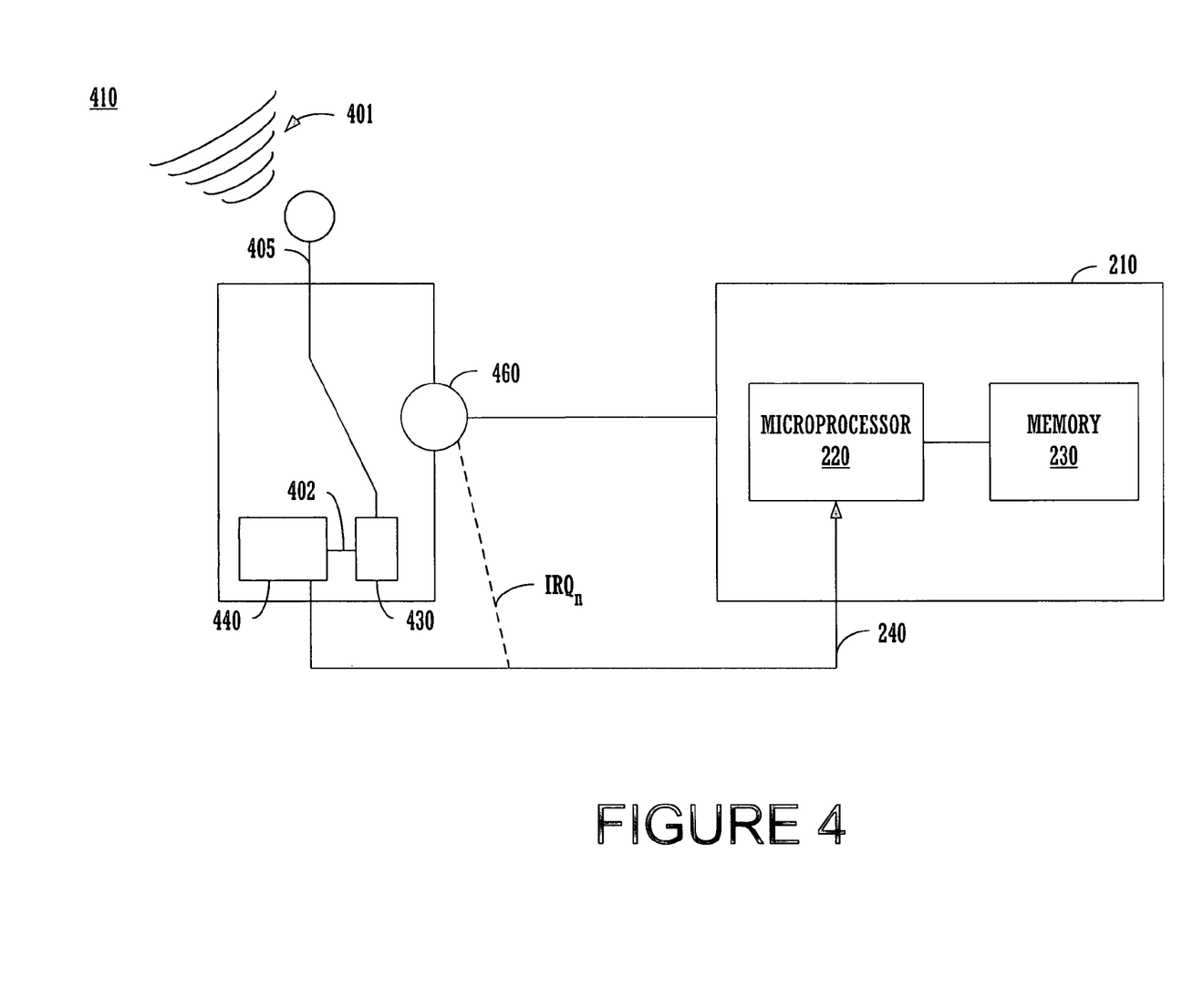
FIG. 4 is an illustration of receiving and transmitting electronic devices during a communication session, in accordance with one embodiment of the presently claimed invention.

FIG. 4 is an illustration of an embodiment of the present invention, using IR communication. According to this embodiment, system 410 comprises device circuit 210 and transceiver circuit 420. Transceiver circuit 420 comprises amplifier 430, antenna 405 and uniform asynchronous receiver transmitter (UART) 440. Antenna 405 receives incoming signal 401 which includes a "request for connection signal" and data information. Signal 401 is an IR signal and is inherently a weak signal, thus amplifier 430 will amplify signal 401. The amplified signal 401 is transmitted via signal line 402 to UART 440. UART 440 sends amplified signal 401 to the interrupt mechanism. The interrupt mechanism responding to signal 401 generates an interrupt signal. The interrupt signal is transmitted to microprocessor 220 via interrupt line 240, which wakes the microprocessor 220. Microprocessor 220 commands communication port 460 to open and receive the data information signal, thus establishing a means for communication of data while a microprocessor is in a sleep mode.

For example, a user of device 410 may be in a business meeting and his device is in sleep mode. The user's business partner joins the meeting later, while negotiation is in progress. Assuming the user of device 410 wishes to alert the partner, in confidence, of certain important issues, which were discussed during the negotiation and while the partner was not attending the meeting, an embodiment of the present invention can properly be used. The user of device 410 may write a short note on device 410 and transmit the note to the business partner using an IR beam. The business partner, who owns a device adapted to receive such communication, will be notified of the message and can respond accordingly. The business partner has options of reading the message and storing/erasing it, or leaving the message unread for a later review.

Figure 5:
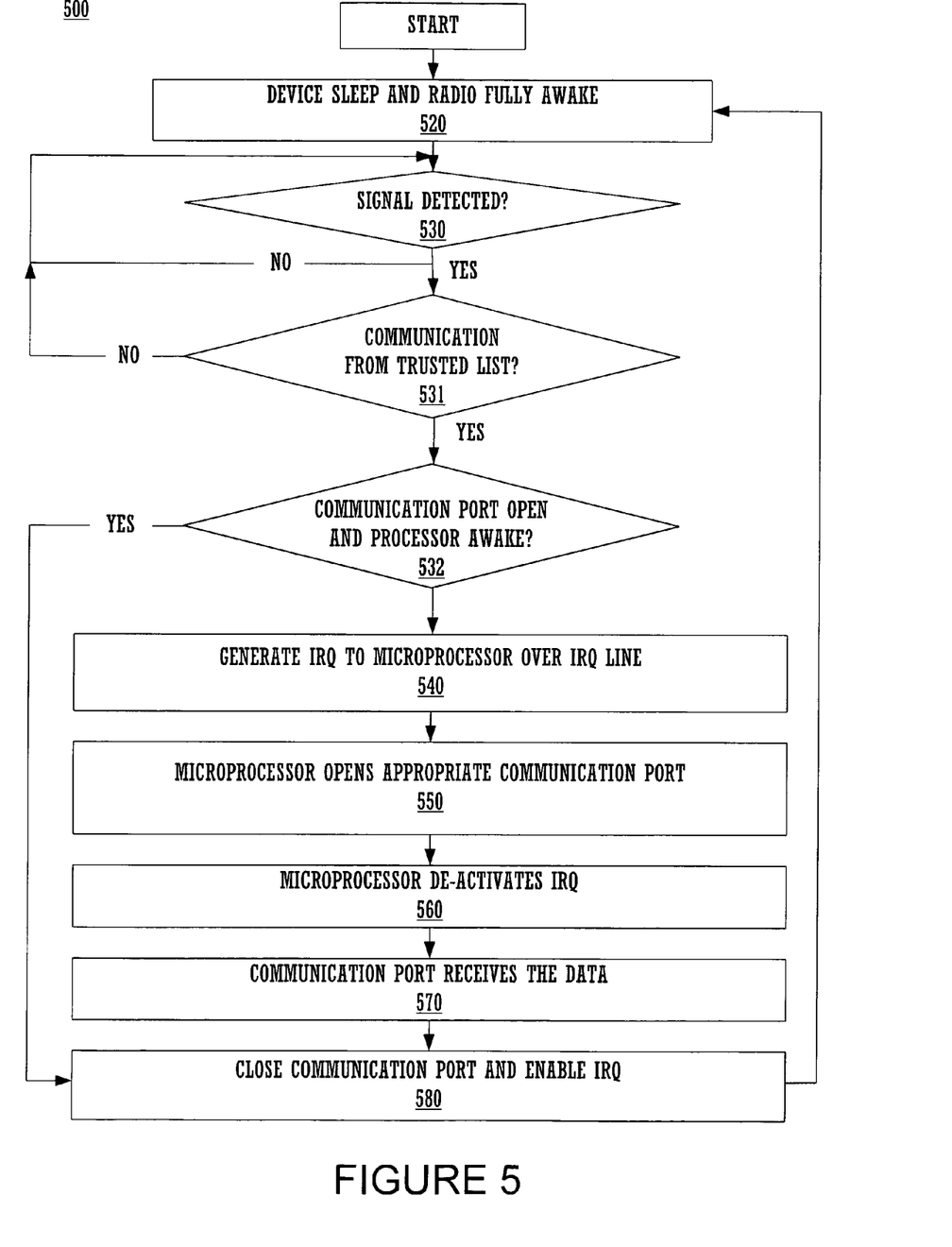
FIG. 5 is a flowchart of a first process of communication between the receiving and transmitting electronic devices according to one embodiment of the presently claimed invention.

FIG. 5 is a flowchart of a first process 500 of communicating between a receiving electronic device and a transmitting electronic device according to one embodiment of the present invention.

In step 520, a receiving portable computer system has its device circuit in a sleep mode and its transceiver circuit is fully operational. The transceiver circuit is coupled to an antenna and the antenna continuously scans for incoming signals.

In step 530, when the receiving portable device receives an electronic signal, the signal is passed on to a network circuit.

In optional step 531, a base band logic in the receiving portable computer determines whether to receive the incoming signal. Determining whether or not to receive the incoming signal is based on a variety of tests. The type of test performed may be based on the transmitting device (e.g., a pre-defined list of trusted devices, a device from which data was received previously), or the type of the incoming signal received (e.g., business cards, memos, not an executable application, etc). If the transmitted signal is not a receivable signal, the receiving portable computer ignores the signal transmitted and continues waiting for the next incoming signal. It is appreciated that the incoming signal includes an identification portion and a data information portion.

In step 532, the network circuit determines if the communication port is open and microprocessor 220 is awake to receive the incoming data information or not. If the communication port is open and microprocessor 220 is awake then the process is transferred to step 570 to receive the data information. However, if the communication port is closed the process is transferred to step 540.

In step 540, an interrupt request is transmitted to the interrupt circuit. The interrupt circuit generates an interrupt and sends the interrupt signal over an IRQ line to the microprocessor.

In step 550, the interrupt signal causes the microprocessor to wake up and to function to its full capacity. The microprocessor includes an interrupt vector in its operating system listing different communication protocol (e.g., Bluetooth, IR, etc.). The microprocessor recognizes the type of the interrupt signal and causes the interrupt vector to send a message to the operating system to invoke the appropriate protocol (e.g., Bluetooth, IR, etc.).

In step 560, the microprocessor de-activates the IRQ to stop receiving interrupt or wake-up signals.

In step 570, the appropriate communication port opens. The receiving device is available to receive incoming data information through the opened communication port. The microprocessor commences receiving data information and stores the data information in the memory, e.g., a cache memory.

In step 580, the microprocessor commands the communication port to close upon complete receipt of the incoming data information. The microprocessor enables the interrupt mechanism and transfers control to step 520, waiting for the next incoming signal, and may optionally return to sleep.

Figure 6:
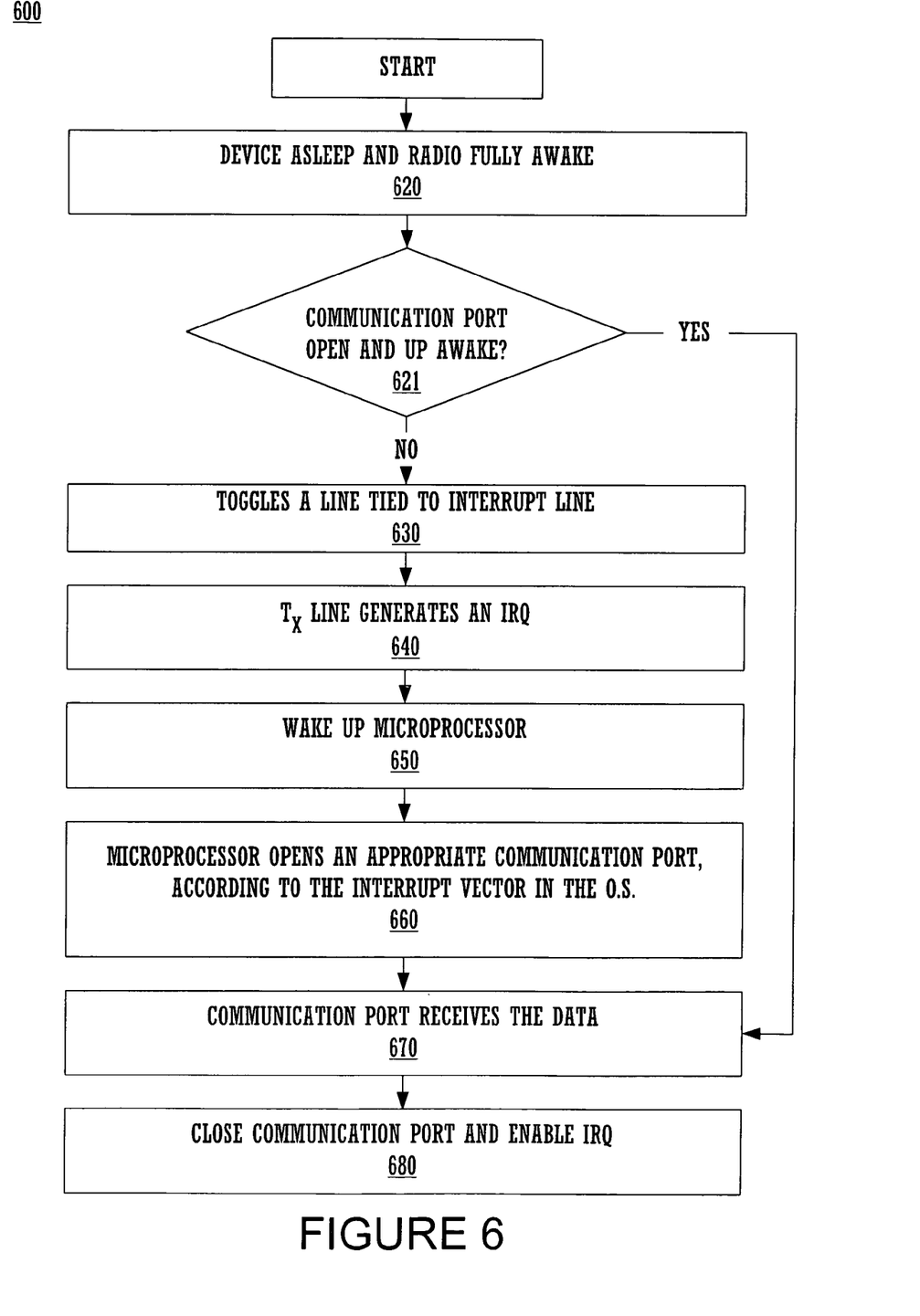
FIG. 6 is a flowchart of a second process of communication between the receiving and transmitting electronic devices according to another embodiment of the presently claimed invention.

FIG. 6 is a flowchart of a second process of communication between receiving and transmitting electronic devices according to another embodiment of the present invention, as shown in FIG. 3.

In step 620 of FIG. 6, the microprocessor in the receiving device is in a sleep mode while the transceiver circuit is fully awake. The transceiver circuit continuously scans for a "request for connection" from a transmitting device.

In step 621, the transceiver circuit in the receiving device receives an in bound signal from a known device and checks to see if the communication port in the transceiving device is open and microprocessor 220 is awake. In case the communication port is open and microprocessor 220 is awake, control is transferred to step 670.

In step 630, the communication port is closed and the receive data line toggles a line connected to the interrupt mechanism.

In step 640, the interrupt mechanism sends the interrupt signal to the microprocessor of device circuit of the receiving device. The microprocessor is normally in a sleep mode.

In step 650, the interrupt signal causes the microprocessor to wake up. The microprocessor is in its wake state functions to its full capacity and disables the wake-up interrupt.

In step 660, microprocessor sends a command to its operating system to invoke an interrupt vector residing in the operating system. The interrupt vector residing in the operating system includes different communication protocols (e.g., Bluetooth, IR, etc.). The microprocessor, based on the received signal, invokes an appropriate protocol and commands the appropriate communication port to open and accept information.

In step 670, the communication port is open and receives the data information information.

In step 680, the microprocessor closes the communication port after receiving the data information and enables the wake-up interrupt mechanism.

Figure 7:
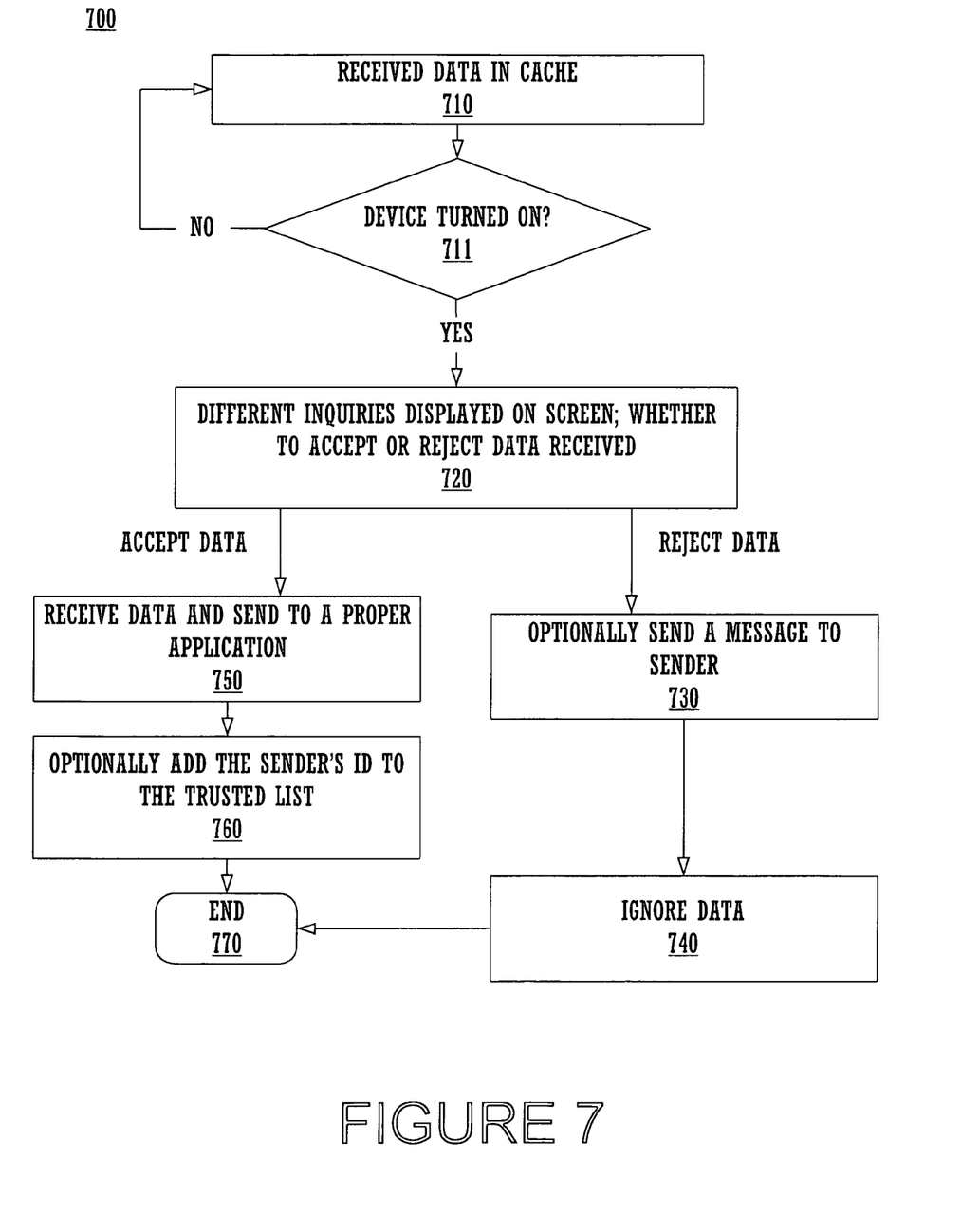
FIG. 7 is a flowchart of the steps of a process of waking up a receiving device from a sleep mode and receiving data and providing delayed acceptance/rejection.

FIG. 7 is a flowchart of the steps of a process of waking up a receiving device from a sleep mode and receiving data and providing delayed acceptance/rejection.

In step 710, the receiving device is in sleep mode and receives data information through a communication port and stores the information in a cache memory.

In step 711, the information will remain in the cache memory while the receiving device is not turned on. If the device is turned on, the process will transfer to step 720.

In step 720, the device is turned on and a user is notified of receipt of data information. A user causes a display screen inquiry session to appear on the display screen of the device. The screen displays a notification to the user to either accept or reject the message. The user decides whether to accept or to reject the data information. If the user decides to accept the data information, the control will transfer to step 750.

In step 730, the user rejects the data received and optionally sends a message to the transmitting device.

In step 740, the user ignores the data received and process is transferred to step 770.

In step 750, the user receives the data received and sends the data to a proper application.

In step 760, the user receives the data and optionally adds the identification of the transmitting device to the trusted list.

In step 770, the user terminates the interactive session with the device.

In summary, the present invention provides a system and methods for allowing wireless communicating between two electronic devices, while a microprocessor in a receiving electronic device is in a sleep mode. In accordance with the present invention a communication device in the receiving device continuously scans for in bound signals while its microprocessor is in sleep mode. Upon detecting an in bound signal, the receiving electronic device generates an interrupt signal. The interrupt signal wakes the microprocessor, which opens the communication port, and data information is received. Advantageously, the communication port can be shut down when not in use thereby saving power.

The foregoing description of specific embodiment of the present invention has been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for receiving information comprising:
   a) transmitting a communication signal including a connection request from a first electronic device to a second electronic device using a wireless communication protocol, said second electronic device comprising a processor and a wireless communication device;
   b) said wireless device in said second electronic device continuously scanning for wireless traffic while said processor is in a sleep mode;
   c) initially receiving said communication signal including said connection request from said first device while a communication port of said second electronic device is closed;
   d) in response to said connection request said wireless communication device triggering an interrupt line activating the processor; and
   e) said processor opening said communication port and receiving the communication signal;
   f) storing said communication signal;
   g) upon power-up, notifying a user that a communication has been stored; and
   h) providing said user with an accept/reject function with respect to any stored communications.

2. A method as described in claim 1 wherein said second electronic device is a personal digital assistant (PDA).

3. A method as described in claim 1 wherein said second electronic device is a handheld computer.

4. A method as described in claim 1 wherein said wireless communication device substantially complies with the Bluetooth specification.

5. A method as described in claim 1 wherein said wireless communication device is Infrared (IR).

6. A method as described in claim 1 further comprising the steps of determining if said first electronic device belongs to a list of trusted devices before generating said interrupt to wake said processor.

7. A method as described in claim 6 wherein said processor adds an identification of a transmitting device to said list of trusted devices.

8. A method as described in claim 6 wherein a user initially creates said list of trusted devices in said processor.

9. A method as described in claim 1 wherein said communication port is a serial port.

10. A method as described in claim 1 wherein said communication port is a universal serial bus (USB) port.

11. A portable electronic device comprising:
    a processor capable of being switched between a sleep mode and an awake mode;
    a wireless receiver continuously scanning for wireless message traffic independent of the sleep/wake state of said processor;
    a communication port coupled to said wireless receiver and coupled to said processor and for receiving information from said wireless receiver; and
    an interrupt mechanism for generating a wake-up interrupt signal for waking said processor in response to any wireless message traffic detected by said wireless receiver,
    wherein said processor is for opening said communication port in response to said wake-up interrupt signal and further for causing wireless information to be received and stored,
    wherein said processor is also for notifying a user of any saved messages upon said portable electronic device being powered on and providing said user with an accept/reject function regarding said saved messages.

12. A portable electronic device as described in claim 11 wherein said wireless receiver comprises a base band processor for identifying the transmitting device of detected wireless traffic and for comparing said transmitting device against a list of trusted devices.

13. A portable electronic device as described in claim 11 wherein said portable electronic device is a handheld computer.

14. A portable electronic device as described in claim 11 wherein said portable electronic device is a pager.

15. A portable electronic device as described in claim 11 wherein said communication port is a serial port.

16. A portable electronic device as described in claim 11 wherein said wireless receiver is substantially compliant with the Bluetooth communication protocol.

17. A portable electronic device as described in claim 11 wherein said wireless receiver is infrared.

* * * * *